US009955498B1

(12) United States Patent
Govindassamy et al.

(10) Patent No.: US 9,955,498 B1
(45) Date of Patent: Apr. 24, 2018

(54) METHOD AND APPARATUS FOR FASTER SYSTEM INFORMATION ACQUISITION

(71) Applicant: MBIT WIRELESS, INC., Newport Beach, CA (US)

(72) Inventors: Sivakumar Govindassamy, San Diego, CA (US); Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 215 days.

(21) Appl. No.: 14/723,773

(22) Filed: May 28, 2015

(51) Int. Cl.
*H04W 72/12* (2009.01)

(52) U.S. Cl.
CPC ........ *H04W 72/1289* (2013.01); *H04W 72/12* (2013.01)

(58) Field of Classification Search
CPC ......... H04W 72/1278; H04W 72/1289; H04W 72/005; H04W 72/0406; H04W 72/04; H04W 72/12; H04W 72/00; H04W 72/1294
USPC ........................................................ 370/336
See application file for complete search history.

(56) References Cited

U.S. PATENT DOCUMENTS

| | | | | |
|---|---|---|---|---|
| 2011/0205982 A1* | 8/2011 | Yoo | ....................... | H04L 1/0038 370/329 |
| 2013/0016841 A1* | 1/2013 | Fong | ....................... | H04L 5/001 380/287 |
| 2013/0242766 A1* | 9/2013 | Xu | ....................... | H04L 25/0202 370/252 |
| 2014/0051426 A1* | 2/2014 | Siomina | ............ | H04W 36/0088 455/422.1 |
| 2015/0117283 A1* | 4/2015 | Wei | ................... | H04W 36/0088 370/311 |
| 2015/0181575 A1* | 6/2015 | Ng | ........................ | H04L 5/0092 370/329 |
| 2016/0119887 A1* | 4/2016 | Charipadi | ........... | H04W 56/001 370/335 |

\* cited by examiner

*Primary Examiner* — Michael Thier
*Assistant Examiner* — Rownak Islam
(74) *Attorney, Agent, or Firm* — Lerner, David, Littenberg, Krumholz & Mentlik, LLP (57) ABSTRACT

In any cellular communication the network transmits broadcast information with some periodicity which is defined by the network parameters. The client terminal must acquire this system information in order to access the services from the network. The time required by the client terminal to acquire all the necessary system information to initiate network access may depend on the scheduling of the system information broadcast by the network. In some cases the scheduling information about some of the system information may be described in another system information message whose schedule may be fixed or known a priori. Conventional method of decoding the complete system information may involve sequential steps which may increase the time required for accessing the services from the network. A method and apparatus are disclosed that enable faster acquisition of the system information and reduce sequential dependency of system information message decoding. Faster acquisition of system information may enable improved mobility performance of the client terminal.

27 Claims, 11 Drawing Sheets

METHOD AND APPARATUS FOR FASTER SYSTEM INFORMATION ACQUISITION

BACKGROUND

Figure 1:
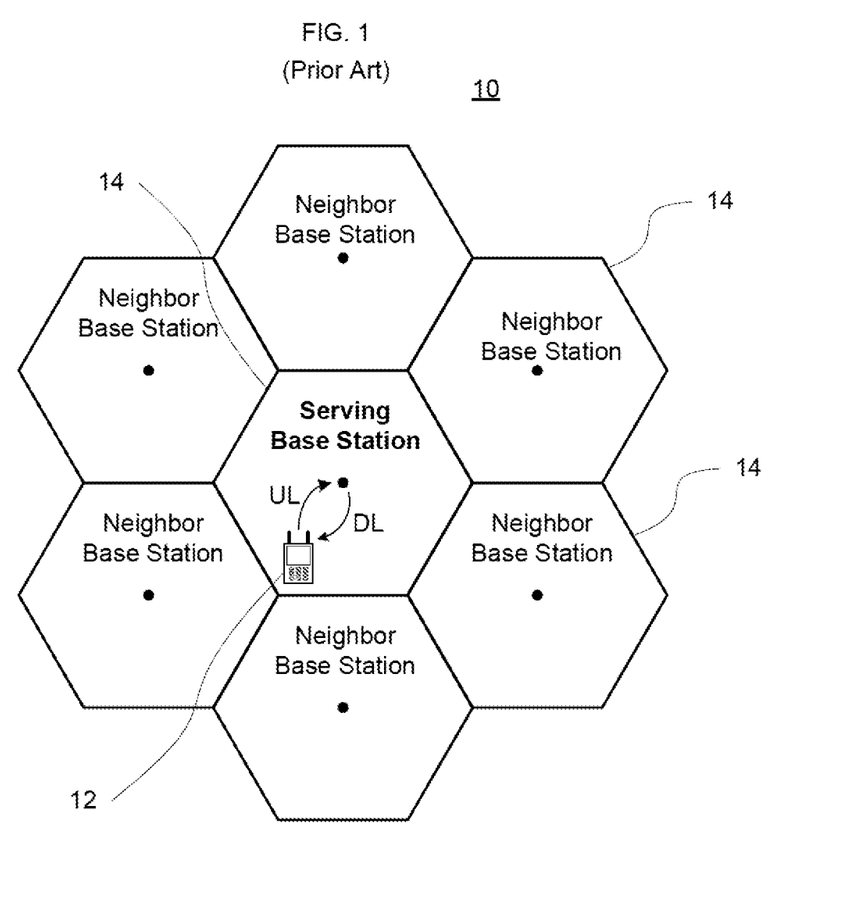
FIG. 1 illustrates a conventional mobile wireless communication system.

As shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station to which the client terminal is communicating with is referred as the serving base station. In some wireless communication systems the serving base station is normally referred as the serving cell. The terms base station and a cell may be used interchangeably herein. In general, the cells that are in the vicinity of the serving cell are called neighbor cells. Similarly, in some wireless communication systems a neighbor base station is normally referred as a neighbor cell.

Figure 2:
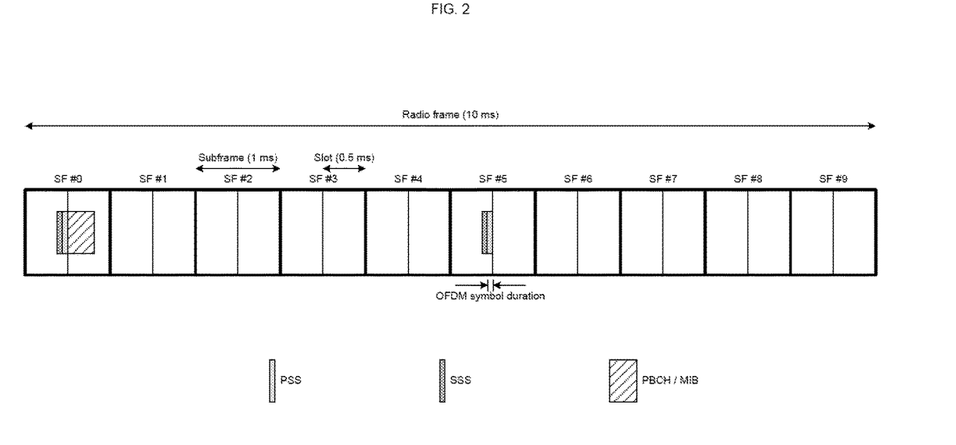
FIG. 2 illustrates the high level air-interface structure of the 3GPP LTE wireless communication system.

The 3GPP LTE wireless communication system air interface is organized into radio frames, subframes, and Orthogonal Frequency Division Multiplexing (OFDM) symbols as shown in FIG. 2. Each radio frame comprises ten subframes numbered from subframe 0 to subframe 9. The radio frame duration is 10 ms and the subframe duration is 1 ms. In 3GPP LTE wireless communication system, a BS is referred to as evolved NodeB (eNB).

As per 3GPP LTE wireless communication system specifications, each cell broadcasts the access information about the system which is required for the client terminals to receive service. The system information is organized into the MasterInformationBlock (MIB) and a number of SystemInformationBlocks (SIBs). The MIB includes a limited number of essential parameters that are required to acquire other system information from a cell.

Figure 3:
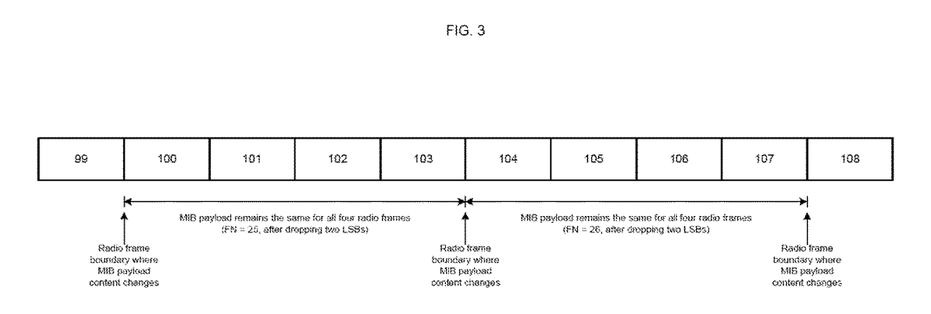
FIG. 3 illustrates an example mapping of the MIB to the radio frames in 3GPP LTE wireless communication system.

As per 3GPP LTE wireless communication system specifications, the MIB is transmitted on the Physical Broadcast Channel (PBCH) in subframe 0 as shown in FIG. 2. The MIB uses a fixed schedule with a periodicity of 40 ms and repetitions made within 40 ms. The first transmission of the MIB is scheduled in subframe #0 of radio frames for which the System Frame Number (SFN) mod 4=0, and repetitions are scheduled in subframe #0 of all other radio frames within the 40 ms window. An example of this is shown in FIG. 3.

Figure 4:
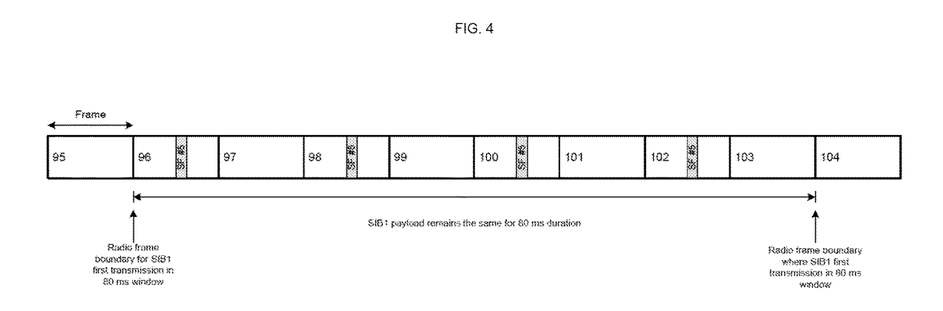
FIG. 4 illustrates an example mapping of the SIB1 to the radio frames in 3GPP LTE wireless communication system.

As per 3GPP LTE wireless communication system specifications, the SIB1 is transmitted on a fixed schedule over the Physical Downlink Shared Channel (PDSCH) with a periodicity of 80 ms and repetitions made within each 80 ms window. The first transmission of SIB1 may be scheduled in subframe #5 of radio frames for which the SFN mod 8=0, and repetitions are scheduled in subframe #5 of all other radio frames for which SFN mod 2=0. An example of this is shown in FIG. 4.

Figure 5:
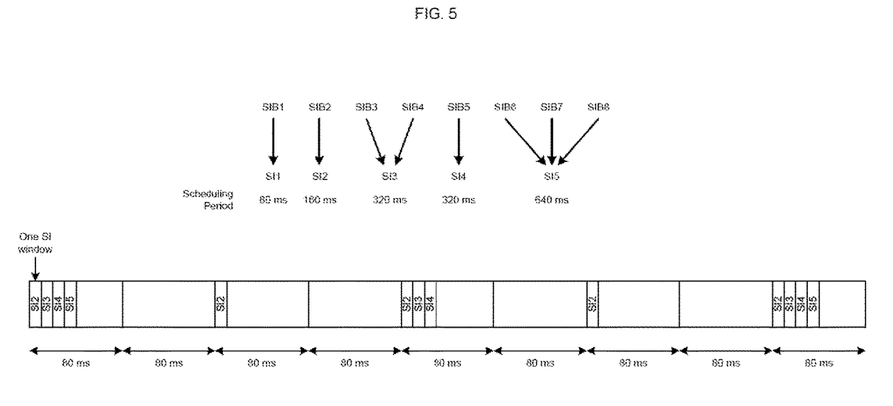
FIG. 5 illustrates an example mapping of the different SIBs to SI messages with different periodicity in 3GPP LTE wireless communication system.

As per 3GPP LTE wireless communication system specifications, the SIBs other than SIB1 are transmitted in SystemInformation (SI) messages and mapping of SIBs to SI messages is flexibly configurable by the Information Element (IE) SchedulingInformation included in the SIB1. Each SIB must be contained only in a single SI message. Only SIBs having the same scheduling requirement (periodicity) can be mapped to the same SI message. The SIB2 is always mapped to the SI message that corresponds to the first entry in the list of SI messages in SchedulingInformation. There may be multiple SI messages transmitted with the same periodicity. SIB1 and all SI messages are transmitted on PDSCH. An example of the mapping of SIBs to SI messages is shown in FIG. 5.

Figure 6:
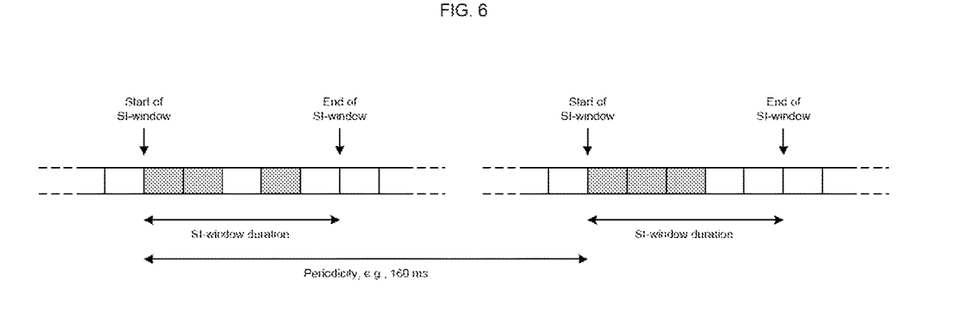
FIG. 6 illustrates an example mapping of the SI messages to SI-windows with different dynamic scheduling within the windows in 3GPP LTE wireless communication system.
Figure 7:
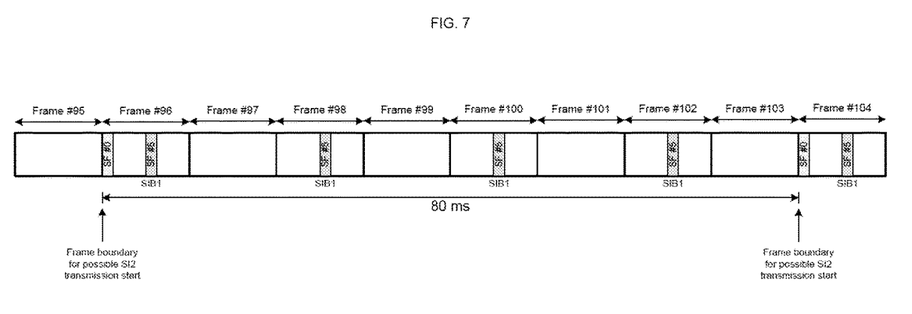
FIG. 7 illustrates an example mapping of the SI2 messages to subframe-0 of SFN mod 8=0 in 3GPP LTE wireless communication system.

As per 3GPP LTE wireless communication system specifications, the SI messages are transmitted within periodically occurring time window, referred to as SI-window, using dynamic scheduling. Each SI message is associated with an SI-window and the SI-window of different SI messages do not overlap, i.e., within one SI-window only the corresponding SI is transmitted. The length of the SI-window is common for all SI messages, and is configurable. Within the SI-window, the corresponding SI message may be transmitted a number of times in any subframe other than Multicast-Broadcast Single Frequency Network (MBSFN) subframes, uplink subframes in TDD (Time Division Duplex), and subframe #5 of radio frames for which SFN mod 2=0. The client terminal acquires the detailed time-domain scheduling from decoding SIB1 which configures the SI-window length and the transmission periodicity for the SI messages. An example of the mapping of the SI messages to SI-windows is shown in FIG. 6. Each rectangular box in FIG. 6 represents one subframe. The shaded boxes are used to indicate the subframes that are used for scheduling SI messages within an SI-window. In the remainder of the present document the terms SIB2 and SI2 are used interchangeably. Decoding of SI2 provides SIB2 and possibly other SIBs depending on the mapping of other SIBs to SI2. SIB2 is always mapped to SI2.

As per 3GPP LTE wireless communication system specifications, the SI messages may be transmitted in the SI-window using dynamic scheduling by the eNB. The SI messages may be transmitted in all subframes in SI-window or the SI messages may be transmitted in some subframes in the SI-window. The eNB may have different SI message transmission scheduling in each SI-window for different SI messages.

Conventional methods depend on successfully decoding the SIB1 first to acquire the detailed time-domain scheduling and other information for other SI messages.

BRIEF SUMMARY

In accordance with an aspect of the present invention, a method for system information acquisition may include controlling, by a processing device, masterinformationblock (MIB) decoding for a currently identified base station for which system information (SI) is to be decoded; and controlling, by the processing device, SI decoding of a system information block (SIB2) for the currently identified base station using SI parameter information of a current serving base station, independent of whether another SI parameter information from SI decoding of another SI block (SIB1) of the currently identified base station is available.

In one alternative, a SI-windowlength parameter and a SI-periodicity parameter may be indicated by each of the SI parameter information and the another SI parameter information.

In one alternative, the method may include, when the another SI parameter information that is same as the SI parameter information is available, controlling, by the processing devices, the SI decoding of the SIB2 using the another SI parameter information.

In one alternative, the method may include determining, by the processing device, whether a current radio frame System Frame Number (SFN) mod 8 is equal to zero; and when the current radio frame System Frame Number (SFN) mod 8 is equal to zero, controlling, by the processing device, flushing of log likelihood ratio (LLR) information stored in a memory.

In one alternative, the method may include, when a current radio frame System Frame Number (SFN) mod 8 is determined to be equal to zero, controlling, by the processing device, the SI decoding of the SIB2 for a subframe of a plurality of subframes of a SI-windowlength for which the SI decoding has not been performed, in which the plurality of subframes of the SI-windowlength is indicated by (i) the SI parameter information when the another SI parameter information that is same as the SI parameter information is unavailable and (ii) the another SI parameter information when the another SI parameter information that is same as the SI parameter information is available, until a determination by the processing control device is the SI decoding of the SIB2 for the subframe is successful.

In one alternative, the SI decoding of the SIB2 may be started from a subframe zero of the SI-windowlength.

In one alternative, the another SI information may indicate scheduling information for decoding at least one additional SI block for the currently identified base station.

In one alternative, the SIB2 may be successfully decoded before the SIB1 is successfully decoded.

In one alternative, the method may include, when the MIB decoding for the currently identified base station is determined to be successful, controlling, by the processing device, the SI decoding of the SIB2 for a subframe 0 of a next radio frame System Frame Number (SFN) mod 8 that is equal to zero.

In one alternative, the method may include, when a radio frame for which the MIB decoding is determined to be successful has a System Frame Number (SFN) mod 8 equal to zero, controlling, by the processing device, the SIB decoding of the SIB2 starting from a subframe other than a subframe zero of the radio frame.

In one alternative, the method may include controlling, by the processing device, acquiring of the SI for the currently identified base station using information indicating at least one of SI-periodicity, SI-Window or other scheduling information for the current serving base station, until the SIBI of the currently identified base station is decoded.

In one alternative, the method may include controlling, by the processing device, the SI decoding of the SIB2 in any subframe of a SI-window of a radio frame for which the MIB decoding is performed, when information indicating a Redundancy Version (RV) is included in a control message that schedules a SI message transmission within the same subframe.

In accordance with an aspect of the present invention, an apparatus for system information acquisition may include a processing device configured to control: masterinformation-block (MIB) decoding for a currently identified base station for which system information (SI) is to be decoded; and SI decoding of a system information block (SIB2) for the currently identified base station using SI parameter information of a current serving base station, independent of whether another SI parameter information from SI decoding of another SI block (SIB1) of the currently identified base station is available from the MIB decoding for the currently identified base station.

In one alternative of the apparatus, a SI-windowlength parameter and a SI-periodicity parameter may be indicated by each of the SI parameter information and the another SI parameter information.

In one alternative of the apparatus, when the another SI parameter information that is same as the SI parameter information is available, the processing device may control the SI decoding of the SIB2 using the another SI parameter information.

In one alternative of the apparatus, the processing device may be configured to determine whether a current radio frame System Frame Number (SFN) mod 8 is equal to zero; and wherein, when the current radio frame System Frame Number (SFN) mod 8 is equal to zero, the processing device controls flushing of log likelihood ratio (LLR) information stored in a memory.

In one alternative of the apparatus, when a current radio frame System Frame Number (SFN) mod 8 is determined to be equal to zero, the processing device may control the SI decoding of the SIB2 for a subframe of a plurality of subframes of a SI-windowlength for which the SI decoding has not been performed, in which the plurality of subframes of the SI-windowlength is indicated by (i) the SI parameter information when the another SI parameter information that is same as the SI parameter information is unavailable and (ii) the another SI parameter information when the another SI parameter information that is same as the SI parameter information is available, until a determination is the SI decoding of the SIB2 for the subframe is successful.

In one alternative of the apparatus, the SI decoding of the SIB2 may be started from a subframe zero of the SI-windowlength.

In one alternative of the apparatus, the another SI information may indicate scheduling information for decoding at least one additional SI block for the currently identified base station.

In one alternative of the apparatus, the SIB2 may be successfully decoded before the SIB1 is successfully decoded.

In one alternative of the apparatus, when the MIB decoding for the currently identified base station is determined to be successful, the processing device may control the SI decoding of the SIB2 for a subframe 0 of a next radio frame System Frame Number (SFN) mod 8 that is equal to zero.

In one alternative of the apparatus, when a radio frame for which the MIB decoding is determined to be successful has a System Frame Number (SFN) mod 8 equal to zero, the processing device may control the SIB decoding of the SIB2 starting from a subframe other than a subframe zero of the radio frame.

In one alternative of the apparatus, the processing device may control acquiring of the SI for the currently identified base station using information indicating at least one of SI-periodicity, SI-Window or other scheduling information for the current serving base station, until the SIBI of the currently identified base station is decoded.

In one alternative of the apparatus, the processing device may control the SI decoding of the SIB2 in any subframe of a SI-window of a radio frame for which the MIB decoding is performed, when information indicating a Redundancy Version (RV) is included in a control message that schedules a SI message transmission within the same subframe.

In accordance with an aspect of the present invention, a wireless communication device may include a receiver to receive system information (SI) about a wireless communication system; and a processing device configured to control: masterinformationblock (MIB) decoding for a currently identified base station for which the SI is to be decoded; and SI decoding of a system information block (SIB2) for the currently identified base station using SI parameter information of a current serving base station, independent of whether another SI parameter information from SI decoding of another SI block (SIB1) of the currently identified base station is available from the MIB decoding for the currently identified base station.

In one alternative of the device, a SI-windowlength parameter and a SI-periodicity parameter may be indicated by each of the SI parameter information and the another SI parameter information.

In one alternative of the device, when the another SI parameter information that is same as the SI parameter information is available, the processing device may control the SI decoding of the SIB2 using the another SI parameter information.

In one alternative of the device, when a current radio frame System Frame Number (SFN) mod 8 is determined to be equal to zero, the processing device may control the SI decoding of the SIB2 for a subframe of a plurality of subframes of a SI-windowlength for which the SI decoding has not been performed, in which the plurality of subframes of the SI-windowlength is indicated by (i) the SI parameter information when the another SI parameter information that is same as the SI parameter information is unavailable and (ii) the another SI parameter information when the another SI parameter information that is same as the SI parameter information is available, until a determination is the SI decoding of the SIB2 for the subframe is successful.

In one alternative of the device, the SIB2 may be successfully decoded before the SIB1 is successfully decoded.

DETAILED DESCRIPTION

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

As per the 3GPP LTE wireless communication system specifications, when acquiring an SI message, the client terminal shall:
  determine the start of the SI-window for the concerned SI message as follows:
    for the concerned SI message, determine the number n which corresponds to the order of entry in the list of SI messages configured by SchedulingInformation IE in SIB1;
    determine the integer value $x=(n-1)*w$, where w is the SI-WindowLength IE in SIB1;
    the SI-window starts at the subframe # a, where $a=x$ mod 10, in the radio frame for which SFN mod $T=FLOOR(x/10)$, where T is the SI-Periodicity of the concerned SI message and FLOOR( ) is defined as a function that rounds its argument to the nearest integer towards negative infinity.

The SI-WindowLength IE in the SIB1 is defined as having one of the following values: 1, 2, 5, 10, 15, 20, and 40 ms. The SI-Periodicity IE in the SIB1 is defined as having one of the following values: 8, 16, 32, 64, 128, 256, and 512 radio frames.

Based on the 3GPP LTE wireless communication system specifications, for SIB2, $x=(n-1)*w$ and n is always 1 and which means $x=(1-1)*w$ and hence x is always 0. Since the SI-window starts at the subframe number a, where $a=x$ mod 10, the start subframe is always 0 for SIB2. Furthermore, the SI is scheduled in the radio frame for which SFN mod $T=FLOOR(x/10)$, where T is the SI-Periodicity of the concerned SI message and since the SI-Periodicity is always a multiple of eight radio frames, the SI-window start radio frame for SIB2 is always 8 or a multiple of 8.

When the client terminal performs cell selection, cell reselection or handover, i.e., in general when transitioning from one eNB to another eNB, it performs time synchronization with the target eNB and decodes the MIB. Once the MIB is decoded, the client terminal may synchronize its internal frame number and timing to that of the target eNB. Once the client terminal decodes the MIB and derives the radio frame number, it maintains the radio frame by incrementing it modulo 1024 since the radio frame number is defined to be a 10-bit number and it wraps around to zero after 1023. Conventionally the client terminal receives the SIB1 and after that it extracts the scheduling information from the decoded SIB1 and then schedules SIB2 decoding. One aspect of the present invention provides a method for a client terminal to decode the SIB2 without waiting for decoding SIB1.

According to an aspect of the present invention, SIB2 decoding is initiated in subframe-0 in a radio frame for which the SFN is multiple of eight; without waiting for decoding the SIB1 message for getting the detailed scheduling information about the SIB2 and other SI messages.

The 3GPP LTE wireless communication system uses Hybrid Automatic Repeat Request (HARQ) with Incremental Redundancy. The initial transmission of a block of data and the subsequent retransmissions may use different Redundancy Version (RV) for improved decoding performance. The RV of a transmission is typically indicated by the network in the corresponding control message. For the case of SI message transmission, repeated transmissions are used without any ACK/NACK (Acknowledgement/Negative acknowledgement) to achieve the benefit of combining the Log Likelihood Ratios (LLRs) over multiple transmissions. The RV of each SI transmission may be indicated explicitly by the network in a control message or derived implicitly by the client terminal as follows.

As per 3GPP LTE wireless communication system specifications, the RV of the received downlink assignment for an SI message in a particular subframe is determined by $$RVK = \text{ceiling}(3/2*k) \bmod 4$$

where k depends on the type of system information message. For SIB1 message, $$k = (SFN/2) \bmod 4$$

For other SI messages, $$k = i \bmod 4, i = 0, 1, \ldots, n_s^w - 1,$$

where i denotes the subframe number within the SI-window of length $n_s^w$ subframes.

The client terminal may determine the RV for the SI message that carries SIB2 based on the known radio frame number and the subframe number. Thus, according to the aspects of the present invention the client terminal may receive and decode the SIB2 message without waiting for successful SIB1 decoding. According to an aspect of the present invention an SIB2 may be decoded before an SIB1.

According to an aspect of the present invention, after successful MIB decoding for the target cell, the client terminal may start the SIB2 decode operation immediately in the subframe 0 of the next SFN mod 8=0.

According to another aspect of the present invention, if the radio frame where the MIB is decoded successfully satisfies the condition SFN mod 8=0, the SIB2 decoding may be started from subframe >=1 of the radio frame in which the MIB was successfully decoded. Even though the first instance of the SI message carrying the SIB2 may be transmitted in subframe-0, any retransmissions that may immediately follow subframe-0 may be used for decoding SIB2.

According to another aspect of the present invention, the client terminal may use the SI-Periodicity, SI-WindowLength, and other scheduling information of its current serving cell for performing SI acquisition for neighbor cells until the SIB1 of the neighbor cells are decoded.

When the SI-Periodicity and SI-WindowLength are not known, it may not be possible to determine the RV of the scheduled SI message in a given subframe other than subframe-0. According to another aspect of the present invention, the SIB2 decode may be performed anywhere in, i.e., in any subframe of, the SI-window if the RV is included in the control message that schedules the SI message transmission within the same subframe.

Figure 8:
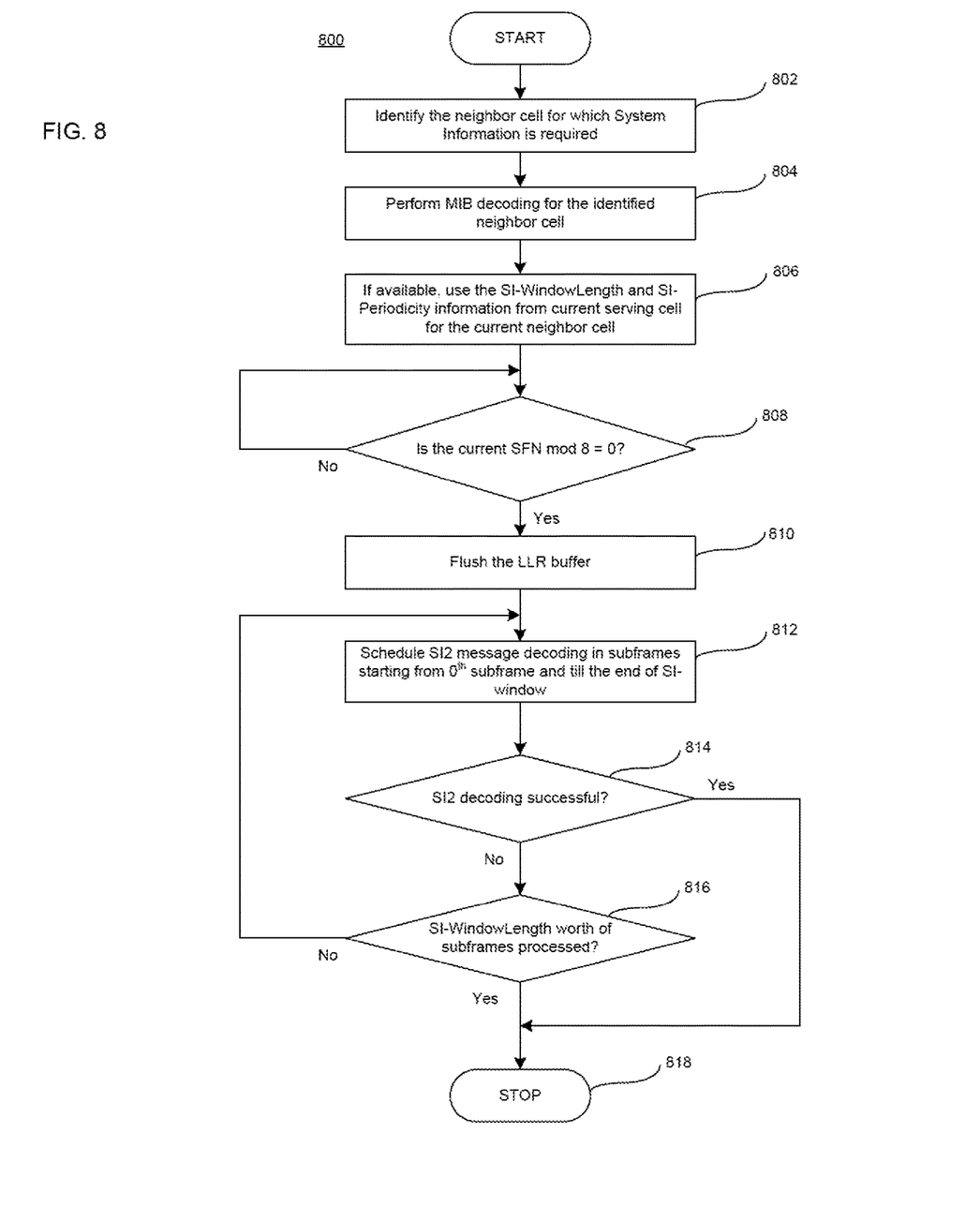
FIG. 8 illustrates an example flow diagram for processing steps according to aspects of the present invention.

The flow diagram 800 contained in FIG. 8 illustrate an exemplary SI2 decoding method according to the various aspects of the present invention. The processing relevant to the present invention begins in the processing stage 802 which identifies the neighbor cell for which the System Information is to be decoded. At processing stage 804 the MIB decoding for the current neighbor cell is performed. At processing stage 806 the SI-WindowLength and SI-Periodicity parameters of the current serving cell of the client terminal are selected for use during current neighbor cell SI decoding until the same parameters become available for the current neighbor cell. At processing stage 808, a determination is made whether the current radio frame SFN mod 8 is equal to zero or not. If that is not the case, the processing returns to the same processing stage 808. If the current radio frame SFN mod 8 is equal to zero, then the processing moves to the processing stage 810 where the LLR storage buffer is flushed to ensure new combining of LLRs from different RV of the potential SI2 instances is initiated. At processing stage 812 the SI2 decoding is scheduled starting from subframe zero. At processing stage 814 a determination is made whether the SI decoding for the currently scheduled subframe is successful or not. If the SI2 decoding is successful, the processing moves to the processing stage 818 where the SI2 decoding procedure suitably terminates. If the SI2 decoding is not successful, a determination is made whether the SI-WindowLength worth of subframes have been attempted or not. If SI-WindowLength worth of subframes have not been attempted, the processing returns to the processing stage 812. If SI-WindowLength worth of subframes have been attempted, the processing terminates at processing stage 818.

According to the aspects of the present invention, the procedure in the flow diagram 800 of FIG. 8 may be used again to attempt to decode SI2 if the SI2 decoding was not successful initially. If the SIB1 of the current neighbor cell is decoded successfully before the next attempt of SI2 decoding of the same cell, the newly decoded SI-WindowLength and SI-Periodicity parameters from the SIB1 of the current neighbor cell may be used.

By way of example only, the above described method may be implemented in a receiver, e.g., a user device such as a wireless mobile station (MS) 12 as shown in FIG. 1.

Figure 9:
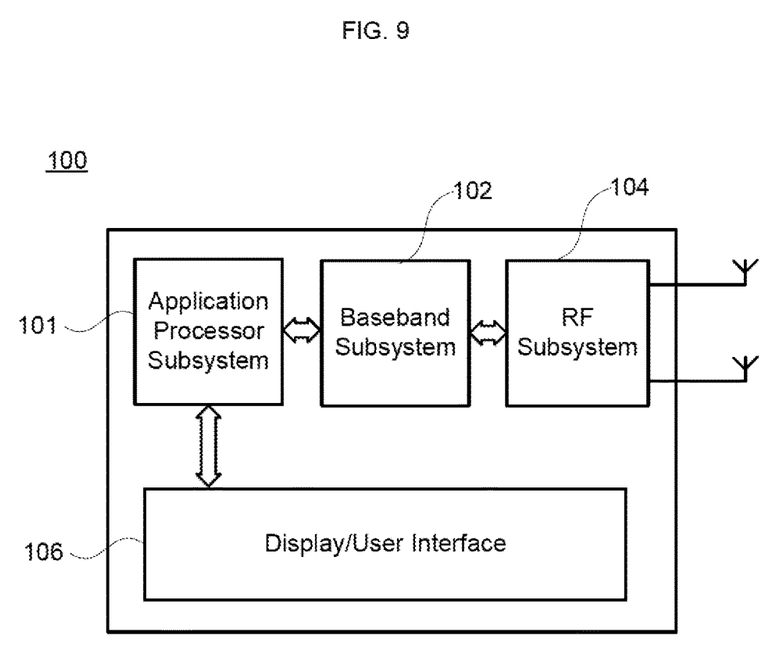
FIG. 9 illustrates a wireless mobile station diagram, which may be employed with aspects of the invention described herein.

As shown in FIG. 9, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 10:
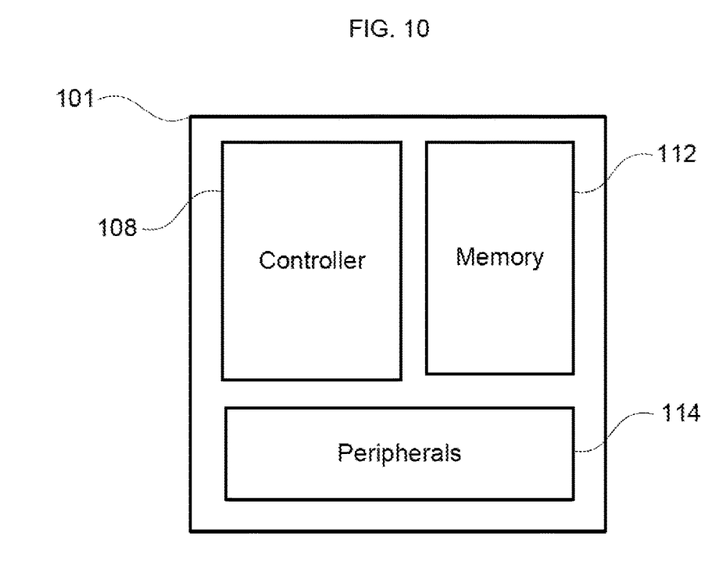
FIG. 10 illustrates an application processor subsystem for a wireless mobile station, which may be employed with aspects of the invention described herein.
Figure 11:
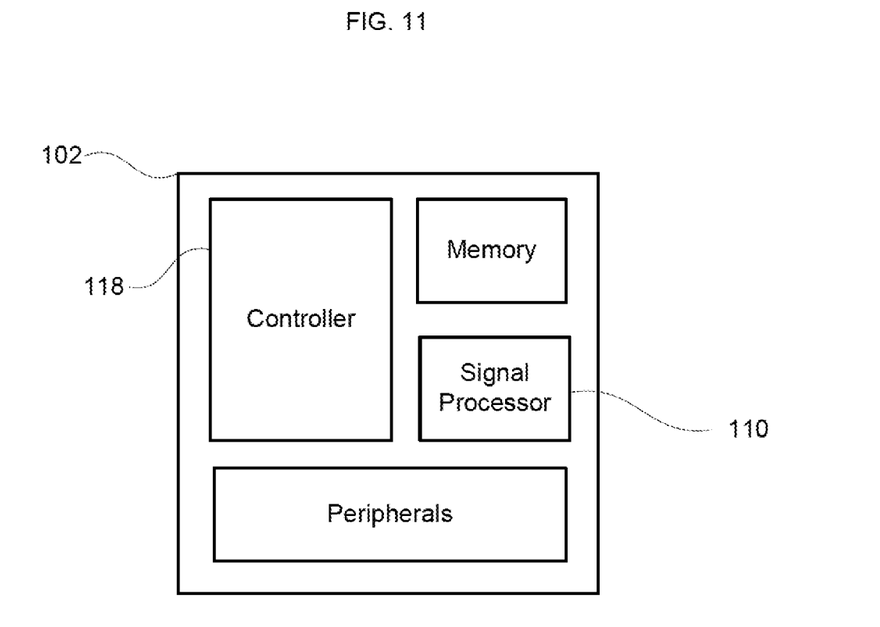
FIG. 11 illustrates a baseband subsystem for a wireless mobile station, which may be employed with aspects of the invention described herein.
Figure 12:
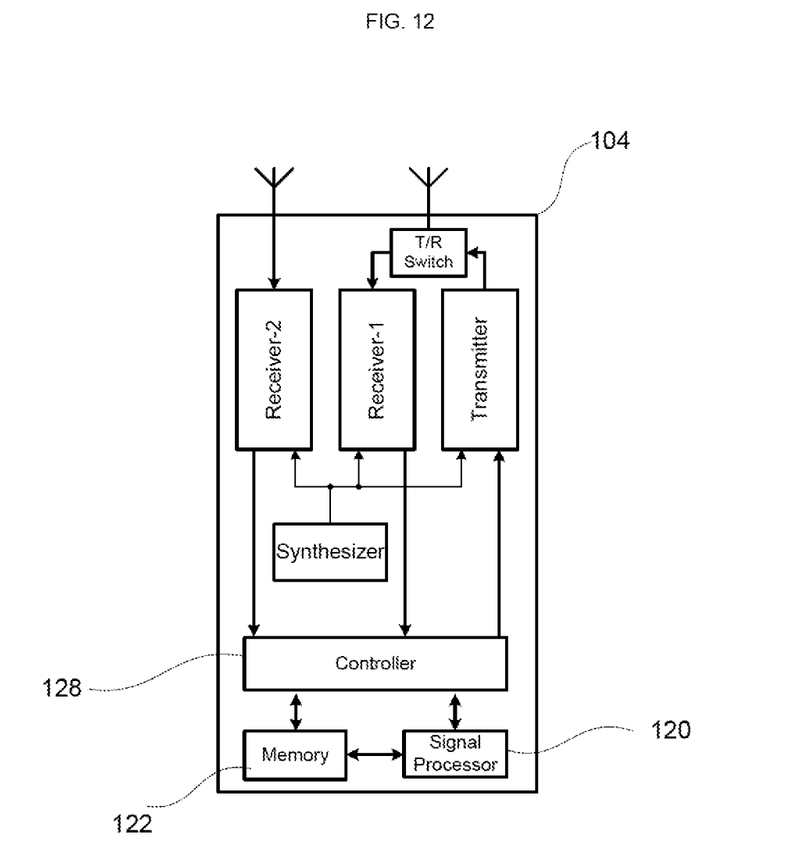
FIG. 12 illustrates an RF subsystem for a wireless mobile station, which may be employed with aspects of the invention described herein.

The application processor subsystem 101 as shown in FIG. 10 may include a controller 108 such as a microcontroller, another processor or other circuitry. The baseband subsystem 102 as shown in FIG. 11 may include a controller 118 such as a microcontroller or other processor. The RF subsystem 104 as shown in FIG. 12 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with the aspects of the present invention.

In FIG. 11 the peripherals 114 such as a full or partial keyboard, video or still image display, audio interface, etc may be employed and managed through the controller 108.

Aspects of the present invention may be implemented in firmware of the controller 108 of the application processor and/or the controller 118 of the baseband subsystem as shown in FIG. 9. In another alternative, aspects of the present invention may also be implemented as a combination of firmware and hardware of the application processor subsystem 101 and/or the baseband subsystem 102. For instance, signal processing functionality of any or all of the FIG. 11 may be implemented in firmware and/or software, which is executed by the system hardware. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the invention may include smartphones, tablets, laptops, gaming consoles, cameras, video camcorders, TV, car entertainment systems, etc.

Although aspects of the invention herein have been described with reference to particular embodiments, it is to be understood that these embodiments are merely illustrative of the principles and applications of the aspects of the present invention. It is therefore to be understood that numerous modifications may be made to the illustrative embodiments and that other arrangements may be devised without departing from the spirit and scope of the aspects of the present invention as defined by the appended claims. Aspects of each embodiment may be employed in the other embodiments described herein.

The invention claimed is:

1. A method for system information acquisition comprising:
controlling, by a processing device, masterinformationblock (MIB) decoding for a currently identified base station for which system information (SI) is to be decoded; and
controlling, by the processing device, SI decoding of a system information block 2 (SIB2) for the currently identified base station using SI parameter information of a current serving base station, independent of whether another SI parameter information from SI decoding of another SI block 1 (SIB1) of the currently identified base station is available,
wherein the SI decoding of the SIB2 is performed without waiting for a determination that the SIB1 is successfully decoded, and
wherein the SI decoding of the SIB2 is started immediately after successful MIB decoding for the currently identified base station, from a subframe zero of a SI-windowlength for which the SI decoding has not been performed.

2. The method of claim 1, wherein a SI-windowlength parameter and a SI-periodicity parameter are indicated by each of the SI parameter information and the another SI parameter information.

3. The method of claim 1, further comprising:
when the another SI parameter information that is same as the SI parameter information is available, controlling, by the processing device, the SI decoding of the SIB2 using the another SI parameter information.

4. The method of claim 1, further comprising:
determining, by the processing device, whether a current radio frame System Frame Number (SFN) mod 8 is equal to zero; and
when the current radio frame System Frame Number (SFN) mod 8 is equal to zero, controlling, by the processing device, flushing of log likelihood ratio (LLR) information stored in a memory.

5. The method of claim 1, further comprising:
when a current radio frame System Frame Number (SFN) mod 8 is determined to be equal to zero, controlling, by the processing device, the SI decoding of the SIB2 for a subframe of a plurality of subframes of the SI-windowlength for which the SI decoding has not been performed, in which the plurality of subframes of the SI-windowlength is indicated by (i) the SI parameter information when the another SI parameter information that is same as the SI parameter information is unavailable and (ii) the another SI parameter information when the another SI parameter information that is same as the SI parameter information is available, until a determination by the processing control device is the SI decoding of the SIB2 for the subframe is successful.

6. The method of claim 1, wherein the another SI information indicates scheduling information for decoding at least one additional SI block for the currently identified base station.

7. The method of claim 1, wherein the SIB2 is successfully decoded before the SIB1 is successfully decoded.

8. The method of claim 1, further comprising:
when the MIB decoding for the currently identified base station is determined to be successful, controlling, by the processing device, the SI decoding of the SIB2 for a subframe 0 of a next radio frame System Frame Number (SFN) mod 8 that is equal to zero.

9. The method of claim 1, wherein, when a radio frame for which the MIB decoding is determined to be successful has a System Frame Number (SFN) mod 8 equal to zero, controlling, by the processing device, the SIB decoding of the SIB2 starting from a subframe other than a subframe zero of the radio frame.

10. The method of claim 1, further comprising:
controlling, by the processing device, acquiring of the SI for the currently identified base station using information indicating at least one of SI-periodicity, SI-Window or other scheduling information for the current serving base station, until the SIBI of the currently identified base station is decoded.

11. The method of claim 1, further comprising:
controlling, by the processing device, the SI decoding of the SIB2 in any subframe of a SI-window of a radio frame for which the MIB decoding is performed, when information indicating a Redundancy Version (RV) is included in a control message that schedules a SI message transmission within the same subframe.

12. An apparatus for system information acquisition comprising:
a processing device configured to control:
masterinformationblock (MIB) decoding for a currently identified base station for which system information (SI) is to be decoded; and
SI decoding of a system information block 2 (SIB2) for the currently identified base station using SI parameter information of a current serving base station, independent of whether another SI parameter information from SI decoding of another SI block 1 (SIB1) of the currently identified base station is available from the MIB decoding for the currently identified base station, wherein the SI decoding of the SIB2 is performed without waiting for a determination that the SIB1 is successfully decoded, and wherein the SI decoding of the SIB2 is started immediately after successful MIB decoding for the currently identified base station, from a subframe zero of a SI-windowlength for which the SI decoding has not been performed.

13. The apparatus of claim 12, wherein a SI-windowlength parameter and a SI-periodicity parameter are indicated by each of the SI parameter information and the another SI parameter information.

14. The apparatus of claim 12, wherein, when the another SI parameter information that is same as the SI parameter information is available, the processing device controls the SI decoding of the SIB2 using the another SI parameter information.

15. The apparatus of claim 12, wherein the processing device is configured to determine whether a current radio frame System Frame Number (SFN) mod 8 is equal to zero; and wherein, when the current radio frame System Frame Number (SFN) mod 8 is equal to zero, the processing device controls flushing of log likelihood ratio (LLR) information stored in a memory.

16. The apparatus of claim 12, wherein, when a current radio frame System Frame Number (SFN) mod 8 is determined to be equal to zero, the processing device controls the SI decoding of the SIB2 for a subframe of a plurality of subframes of the SI-windowlength for which the SI decoding has not been performed, in which the plurality of subframes of the SI-windowlength is indicated by (i) the SI parameter information when the another SI parameter information that is same as the SI parameter information is unavailable and (ii) the another SI parameter information when the another SI parameter information that is same as the SI parameter information is available, until a determination is the SI decoding of the SIB2 for the subframe is successful.

17. The apparatus of claim 12, wherein the another SI information indicates scheduling information for decoding at least one additional SI block for the currently identified base station.

18. The apparatus of claim 12, wherein the SIB2 is successfully decoded before the SIB1 is successfully decoded.

19. The apparatus of claim 12, wherein, when the MIB decoding for the currently identified base station is determined to be successful, the processing device controls the SI decoding of the SIB2 for a subframe 0 of a next radio frame System Frame Number (SFN) mod 8 that is equal to zero.

20. The apparatus of claim 12, wherein, when a radio frame for which the MIB decoding is determined to be successful has a System Frame Number (SFN) mod 8 equal to zero, the processing device controls the SIB decoding of the SIB2 starting from a subframe other than a subframe zero of the radio frame.

21. The apparatus of claim 12, wherein the processing device controls acquiring of the SI for the currently identified base station using information indicating at least one of SI-periodicity, SI-Window or other scheduling information for the current serving base station, until the SIBl of the currently identified base station is decoded.

22. The apparatus of claim 12, wherein the processing device controls the SI decoding of the SIB2 in any subframe of a SI-window of a radio frame for which the MIB decoding is performed, when information indicating a Redundancy Version (RV) is included in a control message that schedules a SI message transmission within the same subframe.

23. A wireless communication device comprising:

a receiver to receive system information (SI) about a wireless communication system; and a processing device configured to control:

masterinformationblock (MIB) decoding for a currently identified base station for which the SI is to be decoded; and SI decoding of a system information block 2 (SIB2) for the currently identified base station using SI parameter information of a current serving base station, independent of whether another SI parameter information from SI decoding of another SI block 1 (SIB1) of the currently identified base station is available from the MIB decoding for the currently identified base station, wherein the SI decoding of the SIB2 is performed without waiting for a determination that the SIB1 is successfully decoded, and wherein the SI decoding of the SIB2 is started immediately after successful MIB decoding for the currently identified base station, from a subframe zero of a SI-windowlength for which the SI decoding has not been performed.

24. The device of claim 23, wherein a SI-windowlength parameter and a SI-periodicity parameter are indicated by each of the SI parameter information and the another SI parameter information.

25. The device of claim 23, wherein, when the another SI parameter information that is same as the SI parameter information is available, the processing device controls the SI decoding of the SIB2 using the another SI parameter information.

26. The device of claim 23, wherein, when a current radio frame System Frame Number (SFN) mod 8 is determined to be equal to zero, the processing device controls the SI decoding of the SIB2 for a subframe of a plurality of subframes of the SI-windowlength for which the SI decoding has not been performed, in which the plurality of subframes of the SI-windowlength is indicated by (i) the SI parameter information when the another SI parameter information that is same as the SI parameter information is unavailable and (ii) the another SI parameter information when the another SI parameter information that is same as the SI parameter information is available, until a determination is the SI decoding of the SIB2 for the subframe is successful.

27. The device of claim 23, wherein the SIB2 is successfully decoded before the SIB1 is successfully decoded.

* * * * *